United States Patent Office 3,187,620
Patented June 8, 1965

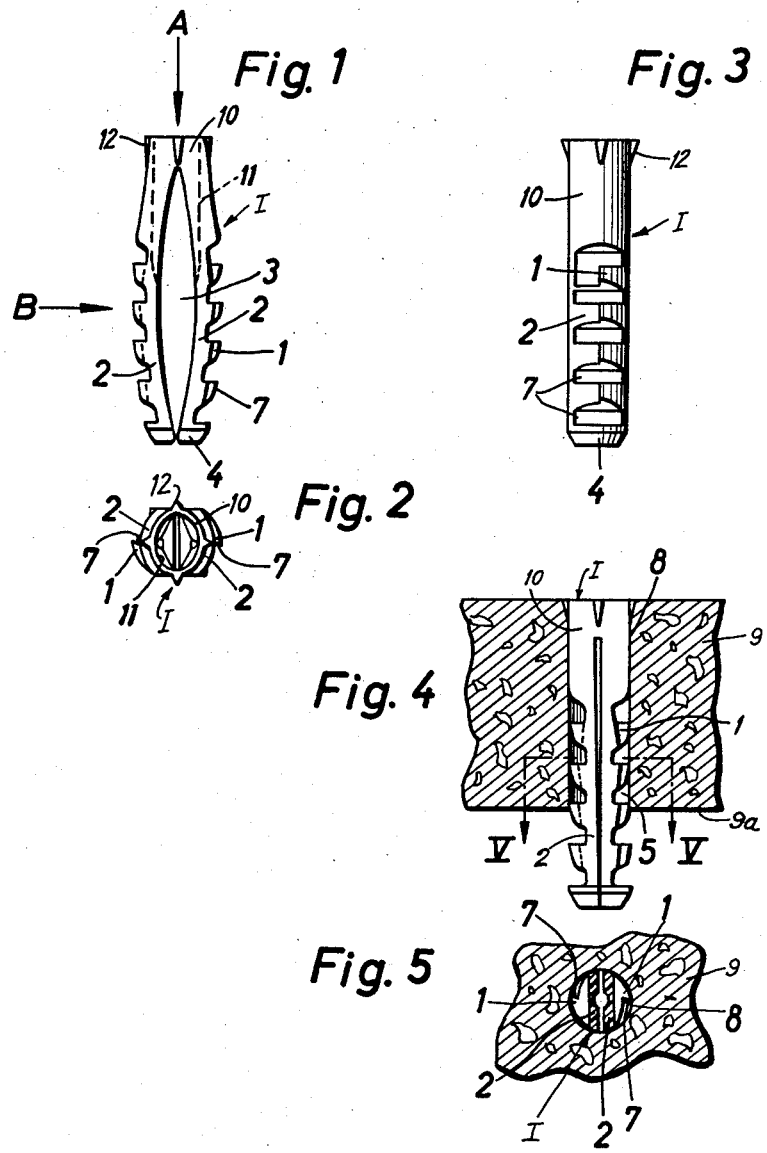

3,187,620
EXPANSION ANCHOR WITH ROTATION-PREVENTING TEETH
Artur Fischer, Tumlingen, Kreis Freudenstadt, Germany
Filed June 4, 1962, Ser. No. 199,880
1 Claim. (Cl. 85—83)

The present invention relates to fastening devices in general, and more particularly to an expansion anchor which is especially suited for facilitating retention of one or more objects on comparatively thin apertured supports of brittle material, such as soft rock, plaster or the like, which cannot properly retain a screw or a similar threaded member.

An important object of the invention is to provide an expansion anchor which is constructed and assembled in such a way that it cannot rotate when it receives a screw or a similar threaded member which must be rotated in order to be driven home.

Another object of the invention is to provide an expansion anchor of the just outlined characteristics which may be mass-manufactured at extremely low cost and which may be put to use by skilled as well as by unskilled persons.

A further object of the invention is to provide an expansion anchor which may be properly inserted into the aperture of a brittle support without necessitating any or by necessitating readily available tools, such as a hammer or a screw driver.

An additional object of the invention is to provide an expansion anchor which can be repeatedly withdrawn from an apertured support if desired.

Still another object of the instant invention is to provide an expansion anchor which is a one-piece structure so that its parts cannot become lost or misplaced.

A concomitant object of the invention is to provide an expansion anchor which resists corrosion and which is capable of constituting a highly satisfactory anchoring device for practically unlimited periods of time.

With the above objects in view, the invention resides in the provision of an expansion anchor which is especially suited for securing one or more objects to a comparatively brittle support, such as soft rock, plaster or the like. The expansion anchor comprises an elongated body having a transverse slit which extends from one end toward but short of the other end thereof and which defines a pair of elongated elastically deformable tongues, and a plurality of rotation-preventing teeth provided externally on at least one of the tongues so as to penetrate into the material of a soft support when a screw or a peg is driven into the slit and causes the tongues to move away from each other.

In accordance with an important feature of my invention, the median portions of the tongues are normally spaced from each other and must be deformed to move toward each other when the body is caused to pass into or through the aperture of a support. It is preferred to form the body in such a way that the combined cross sectional area of the tongues is of substantially oval shape, and at least some of the teeth at the outer side of one or both tongues may be provided with edge faces which bite into the material of the support and which thereby prevent rotation of the expansion anchor when a screw is driven into the anchor to spread the tongues in order to retain the body in the support.

The novel features which are considered as characteristic of the invention are set forth in particular in the appended claim. The invention itself, however, both as to its construction and its method of operation, together with additional objects and advantages thereof, will be best understood from the following detailed description of a specific embodiment with reference to the accompanying drawings, in which:

FIG. 1 is a side elevational view of an expansion anchor whose tongues are shown in undeformed condition;

FIG. 2 is an end view of the expansion anchor as seen in the direction of the arrow A in FIG. 1;

FIG. 3 is another side elevational view of the expansion anchor as seen in the direction of the arrow B in FIG. 1;

FIG. 4 is a section through an apertured support, further showing the expansion anchor in the aperture of the support with the tongues in deformed condition; and FIG. 5 is a transverse section as seen in the direction of arrows from the line V—V of FIG. 4.

Referring now in greater detail to the illustrated embodiment, and first to FIGS. 1 to 3, there is shown an expansion anchor which comprises an elongated body I consisting of tough, elastic, corrosion- and creep-resistant synthetic plastic material. This body I comprises a tubular section 10 which is located at one end thereof and which is preferably of slightly oval cross section (see FIG. 2), and the body is formed with a transverse substantially diametral slit 3 which extends from the tubular section 10 all the way to the other end 4 thereof. In other words, the slit 3 extends from the lower end 4 toward but short of the upper end of the body I, as viewed in FIG. 1. The slit 3 defines a pair of elongated tongues 2 whose upper ends (as viewed in FIG. 1 or 3) are integral with the tubular section 10, and the median portions of the two tongues are normally spaced but may be deformed into actual abutment with each other, see FIG. 4, so that their normally concave inner sides assume the form of substantially flat and substantially parallel surfaces. The outer sides of the tongues 2 are normally convex, and each of these outer sides is provided with rotation-preventing projections or teeth 1 which are preferably uniformly distributed in the longitudinal direction of the tongues. In the illustrated embodiment, each tongue 2 is provided with five teeth 1, but the number of such teeth may be larger or smaller depending on the overall length of the expansion anchor. When the inner sides of the tongues 2 are in or near to actual abutment with each other, the combined cross section of the two tongues is of oval shape.

Each tooth 1 is provided with a cutting edge 7, and these cutting edges are located in planes which are substantially radial with respect to and are parallel with the longitudinal extension of the body I. Consequently, when the anchor is driven into the aperture 8 of a support 9 (see FIGS. 4 and 5), e.g. a soft and brittle rock, and if the bore 11 of the tubular section 10 thereupon receives a screw or a similar threaded elongated fastener member which secures an object (not shown) to the support 9, the edge faces 7 bite into the material of the support 9 and prevent rotation of the expansion anchor if the screw is rotated in a clockwise direction, as viewed in FIG. 2 or 5. The tubular section 10 is provided with radially outwardly extending peripheral projections 12 which also bite into the material of the support 9 and which assist the teeth 1 in preventing rotation of the expansion anchor once the latter is inserted into the aperture 8 (see FIGS. 4 and 5).

As shown in FIG. 2, the bore 11 in the tubular section 10 is of oval shape when the expansion anchor is in undeformed condition, i.e. when this bore does not receive a screw or another fastening element which actually secures an object to the support 9.

The expansion anchor of my invention is mounted in the following manner:

In the first step, the operator drills an aperture 8 into the material of the support 9 so that the bore 8 extends all the way through the support or that its axial length at least equals the axial length of the body I. In the next step, the body I is forced into the aperture 8, with its slotted end 4 leading, whereby the elastically deformable tongues 2 are caused to pass through the aperture by simultaneous movement of their median portions toward each other. The expansion anchor is properly inserted when the tubular section 10 is at least partially accommodated in the aperture 8 and when its projections 12 penetrate into the material of the support 9. Owing to the natural tendency of elastically deformable tongues 2 to reassume the shape of FIG. 1, the teeth 1 engage with or penetrate into the surface bounding the aperture 8 and immediately prevent rotation of the body I. In the final step, a screw or a peg (not shown) is driven into the bore 11 and into the slit 3 to thereby move the tongues away from each other and to cause further penetration of teeth 1 into the material of the support 9. If the bore 11 receives a screw, and if this screw is rotated in a clockwise direction, as viewed in FIG. 5, the edge faces 7 are caused to bite into the material of the support 9 and positively prevent rotation of the body I so that the screw may be driven home.

Of course, the body I need not project beyond the concealed side 9a of the support 9 as long as the overall length of the expansion anchor is sufficient to properly engage the material of the support and to properly retain a screw or a peg in the bore 11 and in the slit 3. Owing to the fact that the bore 11 is normally oval and owing to the fact that the screw or peg is normally of circular cross section, the material of the tubular section expands into strong frictional engagement with the surface bounding the aperture 8 when the screw or peg is driven home.

It will be noted that each tooth 1 comprises a portion which extends all the way to or into close proximity of the slit 3 (FIGS. 2 and 3). The tongues 2 need not be too thick so that they may be deformed while passing through the aperture 8 or while the slit 3 receives a screw or a peg.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claim.

What is claimed as new and desired to be secured by Letters Patent is:

An expansion anchor, particularly for securing objects to comparatively soft and brittle apertured supports of rock and the like, said anchor comprising an elongated body consising of tough elastic corrosion- and creep-resistant synthetic plastic material, said body having a tubular section at a first end thereof and also having a transverse slit extending from a second end toward but short of said first end so as to form two deformable elongated tongues, said tongues being of constant thickness and each thereof having an outwardly arched median portion; and a plurality of rotation-preventing teeth provided externally and distributed in the longitudinal direction of each of said tongues, each of said teeth comprising an arcuate surface portion extending in a circumferential direction from one marginal edge of the tongue to substantially the midpoint of said tongue and terminating in a substantially radial face portion disposed in a plane substantially parallel with the longitudinal axis of said elongated body, the junction of said arcuate surface and said radial face defining a sharp edge portion, said teeth including a second surface portion extending from the radially inner edge of said radial face to the other marginal edge of said tongue, said second surface portion being radially inward of said first mentioned surface portion so that by insertion of a screw or the like into said elongated body said tongues thereof will be forced outwardly with said teeth penetrating into the material of an apertured support in which said body is received, thereby preventing turning of said elongated body relative to said support, said tubular section having an axial bore extending at least to said slit to facilitate insertion of a screw or the like between said tongues.

References Cited by the Examiner

UNITED STATES PATENTS

| | | |
|---|---|---|
| 1,227,627 | 5/17 | Kennedy. |
| 2,006,813 | 7/35 | Norwood. |
| 2,172,125 | 9/39 | Hamill. |
| 3,022,701 | 2/62 | Potruch. |

FOREIGN PATENTS

| | | |
|---|---|---|
| 800,894 | 5/36 | France. |
| 295,595 | 3/54 | Switzerland. |
| 214,125 | 3/61 | Austria. |

EDWARD C. ALLEN, *Primary Examiner.*